C. H. SAYRE.
Shovel.
No. 162,312.
Patented April 20, 1875.
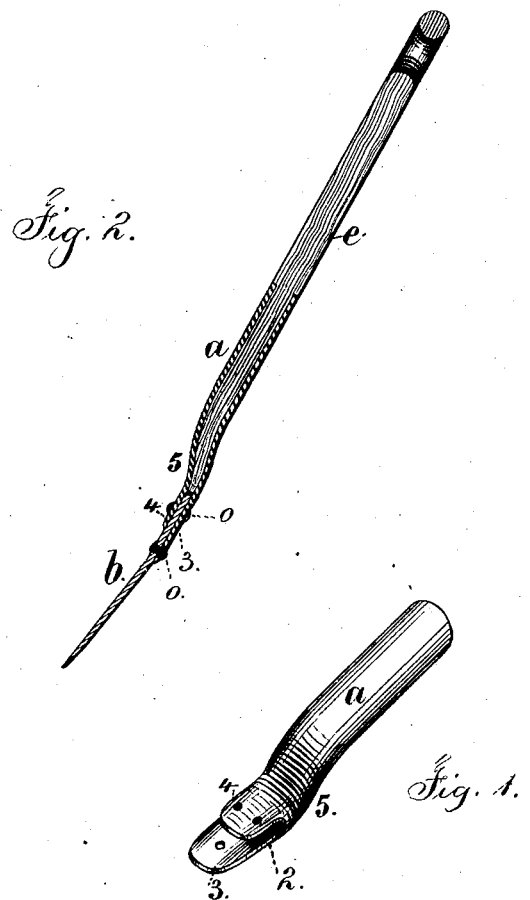
Witnesses,
Chas H Smith
Harold Serrell
Inventor
Charles H. Sayre.
per Lemuel W. Serrell
Atty.

UNITED STATES PATENT OFFICE.

CHARLES H. SAYRE, OF UTICA, ASSIGNOR TO HIMSELF AND ALBERT B. PARKER, OF NEW YORK, N. Y.

IMPROVEMENT IN SHOVELS.

Specification forming part of Letters Patent No. 162,312, dated April 20, 1875; application filed March 25, 1875.

*To all whom it may concern:*

Be it known that I, CHARLES H. SAYRE, of Utica, in the State of New York, have invented an Improvement in Shovels, of which the following is a specification:

Shovels have been made out of sheet metal, with the socket for the handle made as a tube bent up from the sheet metal tongue, extending from the plate that forms the shovel-blade; but this is not a complete tube, neither are the edges welded, and the socket has to be of the same material as the blade, which is expensive, especially where the blade is of steel.

My improvement consists in a shovel or spade handle socket made of an iron or steel tube, bent to the curved shape required, slotted at one end, and spread to fit the surface of the blade, so as to receive such blade into the slot, and secure the same to the tubular socket by welding or rivets.

This construction lessens the cost of manufacturing steel shovels, and increases the strength of the socket and its attachment to the blade without increasing the weight, because a welded tube of thinner metal will be as strong as the bent-up tongue, and there are three thicknesses where the tube and blade are connected.

In the drawing, Figure 1 is a perspective view of the tubular socket separate, and Fig. 2 is a section of the same as attached to the shovel.

The tubular socket $a$ is slotted at 2, and the two parts bent to a shape corresponding to that of the shovel-blade $b$ at the central upper portion thereof, and the lower tongue 3 is preferably longer than the upper tongue 4. The tube is bent at 5 to give the proper curve to the handle, and the wooden handle $e$, after being shaped to fit the tube very tightly, is driven into the same by suitable means. It is generally preferable to steam the ends of the handles before pressing them into the tubular sockets, so that they will bend freely in passing the curved portions of the sockets.

The rivets at $o$ $o$ serve to secure the tubular socket to the shovel or spade blade; but the points may be connected by welding them together.

I do not claim a solid metallic shank split at one end for the blade, and extending to a socket that is made in the other end, as this has been used.

I claim as my invention—

The handle-socket for a shovel or spade, made entirely of an iron or steel tube bent to the curved shape required, and slotted and spread at one end to fit the surface of the blade, and attached to such blade, as set forth.

Signed by me this 19th day of March, 1875.

CHAS. H. SAYRE.

Witnesses:
 THOMAS S. GEARY,
 JACOB HAGEN.